United States Patent
Unru et al.

(10) Patent No.: US 12,556,107 B2
(45) Date of Patent: Feb. 17, 2026

(54) METHOD FOR SUPPLYING A DC LOAD, ENERGY CONVERSION SYSTEM AND ELECTROLYSIS SYSTEM

(71) Applicant: SMA Solar Technology AG, Niestetal (DE)

(72) Inventors: Alexander Unru, Baunatal (DE); Marcel Kratochvil, Kassel (DE); Ralf Juchem, Felsberg (DE)

(73) Assignee: SMA Solar Technology AG, Niestetal (DE)

( * ) Notice: Subject to any disclaimer, the term of this patent is extended or adjusted under 35 U.S.C. 154(b) by 582 days.

(21) Appl. No.: 17/876,664

(22) Filed: Jul. 29, 2022

(65) Prior Publication Data

US 2022/0368243 A1 Nov. 17, 2022

Related U.S. Application Data

(63) Continuation of application No. PCT/EP2020/087295, filed on Dec. 18, 2020.

(30) Foreign Application Priority Data

Feb. 6, 2020 (DE) ..................... 10 2020 103 076.2

(51) Int. Cl.
*H02M 7/04* (2006.01)
*H02J 5/00* (2016.01)
(Continued)

(52) U.S. Cl.
CPC ................ *H02M 7/04* (2013.01); *H02J 5/00* (2013.01); *H02M 7/08* (2013.01); *C25B 9/65* (2021.01)

(58) Field of Classification Search
CPC ................ H02M 7/04; H02J 5/00; C25B 9/65
See application file for complete search history.

(56) References Cited

U.S. PATENT DOCUMENTS

2007/0052369 A1* 3/2007 Lee ................. H02M 3/24 315/277
2010/0118574 A1* 5/2010 Bourgeau ............. H02M 7/23 363/128
(Continued)

FOREIGN PATENT DOCUMENTS

| DE | 4422275 A1 | 12/1995 |
| EP | 2228894 A1 | 9/2010 |

(Continued)

OTHER PUBLICATIONS

International Search Report dated Mar. 11, 2021 in connection with PCT/EP2020/087295.

*Primary Examiner* — Jue Zhang
*Assistant Examiner* — Lakaisha Jackson
(74) *Attorney, Agent, or Firm* — Eschweiler & Potashnik, LLC

(57) ABSTRACT

The disclosure is directed to a method for supplying power to a DC load using an energy conversion system that includes first and second rectifiers and a transformer system. Each of the rectifiers contains an AC-DC converter connected to an AC grid via a separate secondary side of the transformer system. The transformer system provides a first AC voltage having a first voltage amplitude $\hat{U}_1$ on the first secondary side and a second AC voltage having a second voltage amplitude $\hat{U}_2$ on the second secondary side, wherein a value of the second voltage amplitude $\hat{U}_2$ exceeds a corresponding value of the first voltage amplitude $\hat{U}_1$. The method includes operating the first rectifier with a first non-zero power flow $P_1$ to supply power to the DC load when an input voltage $U_{DC,load}$ at the input of the DC load falls below a voltage threshold value $U_{TH}$; wherein a second power flow $P_2$ through the second rectifier is suppressed, and operating the second rectifier with a second non-zero power flow $P_2$ to supply power to the DC load when the input (Continued)

voltage $U_{DC,load}$ at the input of the DC load reaches or exceeds the voltage threshold value $U_{TH}$. The application likewise discloses an energy conversion system for performing the method and an electrolysis system.

16 Claims, 2 Drawing Sheets

(51) Int. Cl.
*H02M 7/08* (2006.01)
*C25B 9/65* (2021.01)

(56) References Cited

U.S. PATENT DOCUMENTS

| | | |
|---|---|---|
| 2013/0278193 A1 | 10/2013 | Rozman et al. |
| 2016/0079951 A1* | 3/2016 | Oosumi ............ H02J 5/00 307/104 |
| 2017/0366029 A1* | 12/2017 | McKenna ............ H02J 9/065 |
| 2018/0076726 A1 | 3/2018 | Hsiao et al. |
| 2018/0138815 A1 | 5/2018 | Yamada et al. |
| 2020/0189404 A1* | 6/2020 | Haugan ............ B60L 53/22 |
| 2020/0251909 A1* | 8/2020 | Falk ............ H02J 3/381 |

FOREIGN PATENT DOCUMENTS

| | | |
|---|---|---|
| EP | 3002868 A1 | 4/2016 |
| EP | 3379679 A1 | 9/2018 |
| GB | 2238635 A | 6/1991 |
| JP | H0365022 A | 3/1991 |
| JP | H09135569 A | 5/1997 |
| JP | 2004140959 A | 5/2004 |
| JP | 2005318663 A | 11/2005 |
| JP | 2009284556 A | 12/2009 |
| JP | 2016096591 A | 5/2016 |
| JP | 2017200327 A | 11/2017 |
| JP | 2018082532 A | 5/2018 |
| WO | 2016050720 A1 | 4/2016 |

* cited by examiner

METHOD FOR SUPPLYING A DC LOAD, ENERGY CONVERSION SYSTEM AND ELECTROLYSIS SYSTEM

CROSS REFERENCE TO RELATED APPLICATIONS

This application is a continuation of International Patent Application No. PCT/EP2020/087295, filed on Dec. 18, 2020, which claims priority to German Patent Application number 10 2020 103 076.2, filed on Feb. 6, 2020, and is hereby incorporated by reference in its entirety.

FIELD

The disclosure relates to a method for supplying power to a DC load from an AC grid using an energy conversion system comprising a transformer system and two rectifiers. The disclosure furthermore relates to an energy conversion system comprising two rectifiers configured to supply power to a DC load from an AC grid, and an electrolysis system having such an energy conversion system, and an electrolyzer as DC load.

BACKGROUND

It is known in principle to supply power to DC loads having a high electrical consumption in parallel with one another via a plurality of energy sources and/or a plurality of energy conversion units. For example, electrolyzers with rated powers in the single-digit to two-digit MW range can be supplied power in each case via a plurality of rectifiers from an AC grid. In this case, a production rate of the electrolysis products, and therefore a power consumption of the electrolyzer, is controlled via a level of its input voltage, wherein the power consumption generally increases as the input voltage increases.

Conventional electrolyzers have a device-specific working range for their input voltages which is limited at the bottom by a minimum input voltage $U_{min}$ and at the top by a maximum input voltage $U_{max}$. The minimum value for the input voltage $U_{min}$ is based on the fact that an electrolysis reaction only takes place at input voltages above $U_{min}$ in the electrolyzer in question. The maximum value for the input voltage $U_{max}$ characterizes a maximum permissible power of the electrolyzer and should not be exceeded, or at least not permanently. In principle, any value within the working range of the input voltage which is limited by $U_{min}$ and $U_{max}$ is allowed. It is desirable here that the electrolysis process can be regulated as continuously as possible throughout the device-specific working range. In this case, consideration should be taken of the fact that an initial working range of an electrolyzer in its new state can shift over the course of its operating duration, for example, as a result of degradation processes. Specifically, the initial working range can shift, for example, overall toward higher input voltages. Furthermore, it is desired that the electrolysis process has as high an efficiency as possible in relation to the electrical energy used. It follows from this that an adjustment of the respective input voltage in the entire working range of the electrolyzer should take place with as few conversion losses as possible. Of course, in this case operation of the electrolysis method, and the energy conversion system itself, should be as inexpensive as possible.

The single-stage rectifiers in question here can be actively controllable single-stage rectifiers which have a bridge circuit comprising transistors and freewheeling diodes. In the case of such a bridge circuit present in the rectifier, a DC voltage $U_{DC}$ at the output of the bridge circuit present in the rectifier across the freewheeling diodes thereof is downwardly limited. Specifically, the DC voltage $U_{DC}$ at the output of an AC-DC converter assigned to the rectifier cannot fall below a specific minimum value. In this case, the minimum value is dependent on an amplitude $\hat{U}$ of the AC voltage present at the input of the AC-DC converter. On the other hand, however, an increase in the DC voltage $U_{DC}$ present on the output side at the AC-DC converter relative to the minimum value can always take place, for example, by suitable clocking of semiconductor switches of the AC-DC converter. In the case of the increase in the DC voltage $U_{DC}$, however, it should be considered that the occurring conversion losses increase as the ratio of the DC voltage $U_{DC}$ generated on the output side relative to the amplitude $\hat{U}$ of the AC voltage present on the input side increases.

If two single-stage rectifiers are now connected on the input side via a common transformer to an AC grid and on the output side in parallel with one another to an input of the DC load, e.g. an electrolyzer, the transformer needs to be configured so that the minimum value of the DC voltage $U_{DC}$ generated on the output side at the AC-DC converter does not exceed the minimum input voltage $U_{min}$ of the electrolyzer, since otherwise a range of the input voltage of the electrolyzer as DC load would exist which cannot be set via the single-stage rectifiers. This can cause high switch-on currents when the rectifiers are connected to the DC load. Problems can also occur when the rectifiers are intended to be disconnected from the DC load since disconnection is then only possible under significant current flow, which can result in increased demands on the disconnecting unit between the rectifiers and the DC load. If, however, the minimum value of the DC voltages $U_{DC}$ at the output of the AC-DC converters assigned to the rectifiers is less than or equal to the minimum input voltage $U_{min}$ of the DC load, not inconsiderable conversion losses result during operation of the electrolyzer which come to bear in particular in the case of a relatively high power consumption, i.e., a relatively high consumption and therefore a relatively high input voltage of the DC load. In addition, these conversion losses can increase further, for example, as a result of degeneration processes, over the course of the operating duration of the electrolyzer.

Document GB 778,989 A discloses an electrolysis system comprising a plurality of electrolysis units that is supplied power in each case via a dedicated polyphase rectifier, in each case by a separate group of a plurality of groups of secondary windings of a transformer. The transformer also has a star-connected and a delta-connected group of primary windings. The secondary windings, which can be present in three-phase or four-phase groups, are phase-shifted relative to one another.

Document DE 10 2014 014091 A1 discloses a method for operating an electrolyzer in which a voltage supply to the electrolyzer takes place via an AC voltage which is rectified by means of a rectifier, and in particular is three-phase. In this case, the voltage applied to the electrolyzer is set by means of a voltage controller, which is at least partially decoupled from the rectifier.

Document GB 2 238 635 B discloses a current source, which is configured to provide a constant DC output voltage, wherein it is supplied an AC input voltage which is within an AC voltage input range. The current source comprises a transformer that provides a number of outputs having a different voltage that are each proportional to the input voltage. Each output is rectified and is in the form of a series circuit comprising a voltage regulator without capacitive smoothing. The outputs of each voltage regulator are connected to a common output at which the constant DC voltage is output.

Document EP 2228894 A1 describes a rectifier comprising a rectifier circuit for providing a rectified intermediate voltage from a plurality of phase voltages of a polyphase system, and a DC-DC converter circuit for generating a preset output voltage from the intermediate voltage. In this case, the DC-DC converter circuit is designed to provide three different converter voltages depending on a switching state and to output the output voltage by successive selection of at least two of the three converter voltages in accordance with a clocked operating mode.

Document EP 3379679 A1 discloses an energy supply system for grid supply and grid energy regeneration, having a voltage conversion means, an active, regenerative rectifier and a line-commutated rectifier. The voltage conversion means is electrically connected to an AC grid and to the active, regenerative rectifier and/or to the line-commutated rectifier. In this case, the active, regenerative rectifier is electrically connected on the input side to the AC grid so that, during operation, a first AC voltage is present, while the line-commutated rectifier is electrically connected on the input side to the AC grid so that, during operation, a second AC voltage is present. On the output side, the active, regenerative rectifier and the line-commutated rectifier are each electrically connected to a DC grid. The voltage conversion means is designed so that, during operation, the first AC voltage is lower than the second AC voltage.

SUMMARY

The disclosure is directed to a method for supplying power to a DC load using an energy conversion system connected on the input side to an AC grid and having at least two rectifiers, for example, single-stage rectifiers, in which a consumption of the DC load can be regulated continuously via an input voltage present at the DC load in an entire working range assigned to the DC load for the input voltage. In one embodiment, a voltage range which is inaccessible to an input voltage should be avoided, but at the same time a high consumption of the DC load with as high an efficiency as possible, for example, as few conversion losses of the energy conversion system as possible, should also take place. The disclosure is also directed to an energy conversion system which is suitable for performing the method and also an electrolysis system having such an energy conversion system.

The method according to the disclosure is aimed at supplying power to a DC load using an energy conversion system, wherein the energy conversion system comprises a first rectifier, a second rectifier, and a transformer system. Each of the rectifiers comprises an AC-DC converter and is connected to an AC grid via a separate secondary side of the transformer system. The transformer system is configured in one embodiment to provide a first AC voltage having a first voltage amplitude $\hat{U}_1$ on the first secondary side and a second AC voltage having a second voltage amplitude $\hat{U}_2$ on the second secondary side. In one embodiment, a value of the second voltage amplitude $\hat{U}_2$ exceeds a corresponding value of the first voltage amplitude $\hat{U}_1$.

The method comprises, when an input voltage $U_{DC,load}$ at an input of the DC load falls below a voltage threshold value $U_{TH}$, operating the first rectifier with a first non-zero power flow $P_1$ to supply power to the DC load, while a second power flow $P_2$ through the second rectifier is suppressed (for example, $P_2=0$). The method also comprises, when the input voltage $U_{DC,load}$ at the input of the DC load reaches or exceeds the voltage threshold value $U_{TH}$, operating the second rectifier with a second non-zero power flow $P_2$ to supply power to the DC load.

The fact that the energy conversion system has two rectifiers in one embodiment that are connected to two separate secondary sides of the transformer system should be understood to mean that the energy conversion system comprises at least two rectifiers that are each connected to one of at least two secondary sides of the transformer system. It is therefore also possible according to the disclosure for the energy conversion system to comprise more than two rectifiers and for the transformer system also to comprise more than two secondary sides if each rectifier is connected in each case to a different one of the secondary sides. Each of the two rectifiers can be in the form of a so-called single-stage rectifier. A single-stage rectifier in the context of the disclosure should be understood such that it is free of a DC-DC converter connected downstream of the AC-DC converter. In contrast to this, a rectifier which has a DC-DC converter connected downstream of the AC-DC converter should be understood to mean a multistage or two-stage rectifier in the context of the disclosure. In addition, each of the rectifiers can be in the form of an actively controllable rectifier, which has a bridge circuit comprising transistors. These may be transistors of the type IGBT (Insulated-Gate Bipolar Transistor) or MOSFET (Metal-Oxide-Semiconductor Field-Effect Transistor). Within the bridge circuit, the transistors can each have a freewheeling diode connected in parallel with power terminals of the corresponding transistor. The freewheeling diode may be an intrinsic freewheeling diode of the corresponding transistor or a diode which is separate relative to the corresponding transistor. If not otherwise mentioned, in the disclosure, each of the power flows $P_1$, $P_2$, if it flows from the AC grid in the direction of the DC load, is described or treated as a power flow with a positive mathematical sign. Correspondingly, each of the power flows $P_1$, $P_2$, if it flows from the DC load in the direction of the AC grid, is described or treated as a power flow with a negative mathematical sign. Within this meaning, for example, in method act i), the first rectifier can be operated for supplying power to the DC load with a positive first non-zero power flow $P_1(P_1>0)$. In addition, for example, in method act ii), the second rectifier can be operated for supplying power to the DC load with a positive second non-zero power flow $P_2(P_2>0)$.

The disclosure makes use of the effect that the transformer system has at least two separate secondary sides, wherein each of the secondary sides has a different transformation ratio with respect to the respectively assigned primary side of the transformer system. An AC voltage of the AC grid is transformed to AC voltages having different amplitudes via the two different secondary sides. Specifically, the transformation takes place in such a way that an AC voltage having a first amplitude $\hat{U}_1$ is generated on the first secondary side and an AC voltage having a greater second amplitude $\hat{U}_2$, relative to the first amplitude $\hat{U}_1$, is generated on the second secondary side. Each of the two AC voltages acts as the input voltage for in each case one of the two rectifiers. For example, the AC voltage having the first amplitude $\hat{U}_1$ is supplied to the first rectifier, and the AC voltage having the second amplitude $\hat{U}_2$ is supplied to the second rectifier as the input voltage. Different values for the minimum DC voltages at the output of the AC-DC converters assigned to the respective rectifiers result from the two different AC voltages. In one embodiment, if the rectifiers are in the form of single-stage rectifiers, i.e., if no DC-DC converter is connected downstream of the AC-DC converter in each of the rectifiers, the DC voltage at the output of the AC-DC converter also corresponds to the output voltage of the respective rectifier.

In one embodiment, operation of the energy conversion system occurs so that, in a state in which an input voltage $U_{DC,load}$ at the input of the DC load falls below a threshold value $U_{TH}$, the DC load is supplied power by the first power flow $P_1$ through the first rectifier. On the other hand, the second power flow $P_2$ through the second rectifier is suppressed. A second non-zero power flow $P_2$ through the second rectifier is made possible—and therefore contributes to the power supply to the DC load—when the input voltage $U_{DC,load}$ at the input of the DC load corresponds to the threshold value $U_{TH}$ or exceeds the threshold value $U_{TH}$. In this case, when the second power flow $P_2$ through the second rectifier is enabled, the first power flow $P_1$ can be both suppressed and enabled. This means that the DC load, in the case of voltages at its input that are greater than or equal to the threshold value $U_{TH}$, can be supplied power by the second power flow $P_2$, or by a combination of the first power flow $P_1$ with the second power flow $P_2$.

In one embodiment, the entire working range of the DC load is split into a lower range and an upper range using the voltage threshold value $U_{TH}$. In the lower range, a consumption of the DC load is generally still so small that it can be covered by the first power flow $P_1$ of the first rectifier alone. The first amplitude $\hat{U}_1$ of the AC voltage on the first secondary side is in this case selected such that each voltage value in the lower range of the working range assigned to the DC load can also be reached by the first rectifier. Therefore, a continuous regulation of the DC load down to a minimum input voltage $U_{min}$ assigned to the DC load is ensured via the first rectifier. By virtue of the fact that the second rectifier has an AC voltage having a second amplitude $\hat{U}_2$ which is higher relative to the first amplitude $\hat{U}_1$, a ratio of the input voltage $U_{DC,load}$ of the DC load in the upper range of the working range assigned to the DC load is lower for the second rectifier than for the first rectifier. Therefore, when the second power flow $P_2$ takes place, the conversion losses of the second rectifier are also lower than those of the first rectifier, as a result of which the second rectifier can operate more efficiently. Therefore, a high consumption of the DC load using the second rectifier can take place in the upper range overall with as high an efficiency as possible and therefore low conversion losses. The conversion losses are at least lower relative to a state in which a value for the first amplitude corresponds to a value for the second amplitude. In addition, different transformation ratios of the two secondary sides relative to the primary side assigned to the respective secondary side can be realized with little complexity and at low cost. Advantageous embodiments of the disclosure are specified in the description below, the features of which can be used individually or in any desired combination with one another.

In one embodiment, the rectifiers generally have an AC disconnecting circuit assigned to an input of the rectifier for disconnecting or for connecting an input of the AC-DC converter from or to the AC grid. In addition, they generally have in any case a DC disconnecting circuit, which is arranged between the output of the AC-DC converter and the output of the rectifier and/or the input of the DC load. Therefore, the second power flow $P_2$ through the second rectifier can be suppressed in a simple manner by an open AC disconnecting circuit between the second secondary side of the transformer system and the AC-DC converter of the second rectifier. As an alternative or in addition, it can likewise be suppressed by the DC disconnecting circuit arranged between the AC-DC converter of the second rectifier and the input of the DC load. The same applies accordingly likewise to a suppression of the first power flow $P_1$ through the first rectifier, in this case using an AC disconnecting circuit and/or DC disconnecting circuit assigned to the first rectifier.

In one embodiment, the DC load can have a monotonously rising, for example, a strictly monotonously rising power/voltage (PU) characteristic, which means that a consumption of the DC load increases as the input voltage of the DC load increases. In order to supply sufficient power to the load via the two rectifiers, in one embodiment the power flow taking place overall via the two rectifiers from the AC grid in the direction of the DC load increases as the input voltage of the DC load increases. The power flow taking place overall via the two rectifiers from the AC grid toward the DC load results from the sum of the first power flow $P_1$ taking place via the first rectifier and the second power flow $P_2$ taking place via the second rectifier. In one embodiment employing a single-stage rectifier which is galvanically connected to the DC load, the input voltage of the DC load also corresponds to that DC voltage which prevails at the output of the AC-DC converter assigned to the respective rectifier. When a power consumption of the DC load is now intended to be increased, starting from an input voltage of the DC load below the voltage threshold value $U_{TH}$, method acts i), ii) can be run through in an order such that method act ii) follows on temporally from method act i). If, on the other hand, a consumption of the DC load is intended to be reduced over the course of time, it is likewise possible in the method for method acts i), ii) to be run through in an order such that method act i) follows on temporally from method act ii). In one embodiment of the method, method acts i) and ii) can be repeated temporally. By virtue of in this case temporally repeated checking of the input voltage $U_{DC,load}$ relative to the voltage threshold value $U_{TH}$, a change in the consumption of the DC load can be tracked and responded to using the control circuit. As an alternative or in addition to this, it is also possible to adjust or dispense with a predefined consumption/time profile of the DC load using the control circuit by temporal repetition of method acts i) and ii).

Advantageously, the method can be used in the context of a startup procedure for supplying power to the DC load using the energy conversion system. In this case, in an initial state of the startup procedure, both the first power flow $P_1$ and the second power flow $P_2$ of the energy conversion system are suppressed, for example by open DC disconnecting circuits of the two rectifiers. At first, owing to the different values of first amplitude $\hat{U}_1$ and second amplitude $\hat{U}_2$ and owing to a current flow through the freewheeling diodes of the AC-DC converters, different DC voltages $U_{DC,1}$, $U_{DC,2}$ are set at the outputs of the two AC-DC converters. During the startup procedure, a load-free connection, or a virtually load-free connection, of the first rectifier to the DC load can take place by closing the DC disconnecting circuit of the first rectifier since the DC voltage at the output of the AC-DC converter assigned to the first rectifier does not exceed the minimum input voltage $U_{min}$ of the DC load. As an alternative or in addition, the method can also be used in the context of a shutdown procedure during the power supply to the DC load using the energy conversion system. In this case, the energy conversion system is advantageously intended to be disconnected from the DC load in load-free fashion. In this case, starting from a state in which the DC load is supplied power exclusively by the first power flow $P_1$, the input voltage of the DC load $U_{DC,load}$ is reduced down to the minimum input voltage $U_{min}$ of the DC load. As a result, likewise a power consumption of the DC load, and therefore the first power flow $P_1$, is reduced to a value of virtually 0 W. In an end state of the shutdown procedure, therefore, both the first power flow $P_1$ and the second power flow $P_2$ can be suppressed. Disconnection of the first rectifier from the DC load can take place in this case in largely load-free fashion and without any current flow, for which reason the DC disconnecting circuits, optionally also the AC disconnecting circuits, can be configured to be comparatively simple and inexpensive.

In one embodiment of the method, in method act ii), a ratio of the first power flow $P_1$ to the second power flow $P_2$ in accordance with $P_1/P_2$ for supplying power to the DC load can be minimized as far as possible and can optionally be 0, so that the efficiency of the AC-DC conversion is optimized. In this case, the ratio of the first power flow $P_1$ to the second power flow $P_2$ can be reduced further as long as the consumption of the DC load does not exceed a nominal power of the second rectifier. By virtue of the fact that, in method act ii), a value for the second power flow $P_2$ which is larger relative to the value of the first power flow $P_1$ is selected, the conversion losses of the energy conversion system which are associated with the power supply to the DC load can be minimized further since the second rectifier has a higher efficiency than the first rectifier in the case of relatively high input voltages of the DC load.

An energy conversion system according to the disclosure for supplying power to a DC load from an AC grid comprises a transformer system connectable on the primary side thereof to the AC grid and configured to provide a first AC voltage having a first voltage amplitude $\hat{U}_1$ on a first secondary side and a second AC voltage having a second voltage amplitude $\hat{U}_2$ on a second secondary side of the transformer system, wherein a value of the second voltage amplitude $\hat{U}_2$ exceeds a corresponding value of the first voltage amplitude $\hat{U}_1$. The system further comprises a first rectifier and a second rectifier, which are connected on their respective input side, i.e. on their respective AC-side, in each case to one of the two secondary sides of the transformer system and are each connectable on their respective output side, i.e. on their respective DC-side, in parallel with one another to an input of the DC load, and a control circuit configured to control the energy conversion system. The energy conversion system, in conjunction with the control circuit, optionally in combination with further components of the energy conversion system, is configured, in one embodiment, to perform the various methods according to the disclosure. The advantages already mentioned in connection with the method result.

In accordance with one embodiment of the energy conversion system, the transformer system can comprise at least two separate transformers, wherein the first transformer comprises a first primary side and the first secondary side coupled inductively thereto, and wherein the second transformer comprises a second primary side, that is different than the first primary side, and the second secondary side inductively coupled thereto. As an alternative to this, it is possible for the transformer system to have only one primary side, that is inductively coupled both to the first secondary side and to the second secondary side.

Advantageously, the transformer system of the energy conversion system can comprise a plurality of taps for varying the first amplitude $\hat{U}_1$ and/or the second amplitude $\hat{U}_2$ relative to an amplitude of the AC voltage of the AC grid. For example, in the case of the existence of one primary side that is inductively coupled both to the first secondary side and to the second secondary side of the transformer system, the taps can be arranged on this primary side. In an embodiment in which the transformer system comprises two separate transformers, the plurality of taps can be arranged on at least one of the first primary side and the second primary side. As an alternative or in addition, however, they can also be arranged on at least one of the two secondary sides. The first amplitude $\hat{U}_1$ and/or the second amplitude $\hat{U}_2$ can be altered using the presently selected tap either manually or automatically using the control circuit. A transformation ratio and therefore the AC voltages present on the respective secondary sides of a drift in the input voltage of the DC load taking place over the course of time can be adapted via the plurality of taps.

Generally, a measurement device configured to detect a first DC voltage $U_{DC,1}$ or a second DC voltage $U_{DC,2}$ at the outputs of the corresponding AC-DC converter is provided in any case in the case of the rectifiers for regulation purposes during their operation. When the DC disconnecting circuit of the first rectifier is closed, the first DC voltage $U_{DC,1}$ at the output of the AC-DC converter assigned to the first rectifier corresponds to the input voltage of the DC load. This also applies to the second DC voltage $U_{DC,2}$ at the output of the AC-DC converter assigned to the second rectifier when the DC disconnecting circuit of the second rectifier is closed. When the DC disconnecting circuits are open, it may be advantageous, however, to detect the prevailing DC voltage on each side of the DC disconnecting circuit of the rectifiers. In one embodiment, the energy conversion system can therefore, as an alternative or in addition thereto, comprise a measurement device connected to the control circuit for detecting the input voltage $U_{DC,load}$ present at the input of the DC load.

In principle, it is possible for the energy conversion system to comprise two multistage rectifiers, in which in each case one DC-DC converter is arranged between the AC-DC converter and the output of each rectifier. In accordance with one embodiment of the energy conversion system, however, the first rectifier and/or the second rectifier can comprise a single-stage rectifier. In this case, a single-stage rectifier is free from a DC-DC converter arranged between the AC-DC converter and the output of the rectifier. Independently of the configuration as a single-stage or multistage rectifier, it is possible for the first rectifier and/or the second rectifier to be configured and set up for a bidirectional power flow. By virtue of the fact that at least one of the two rectifiers is configured for a bidirectional power flow, the energy conversion system can render grid services in favor of the AC grid. Such grid services can include, for example, power factor correction of the AC grid.

An electrolysis system according to the disclosure comprises an energy conversion system according to the disclosure and an electrolyzer as DC load. The advantages already cited in conjunction with the method and the energy conversion system result.

BRIEF DESCRIPTION OF THE FIGURES

The disclosure is illustrated below with the aid of figures, in which.

DETAILED DESCRIPTION

Figure 1:
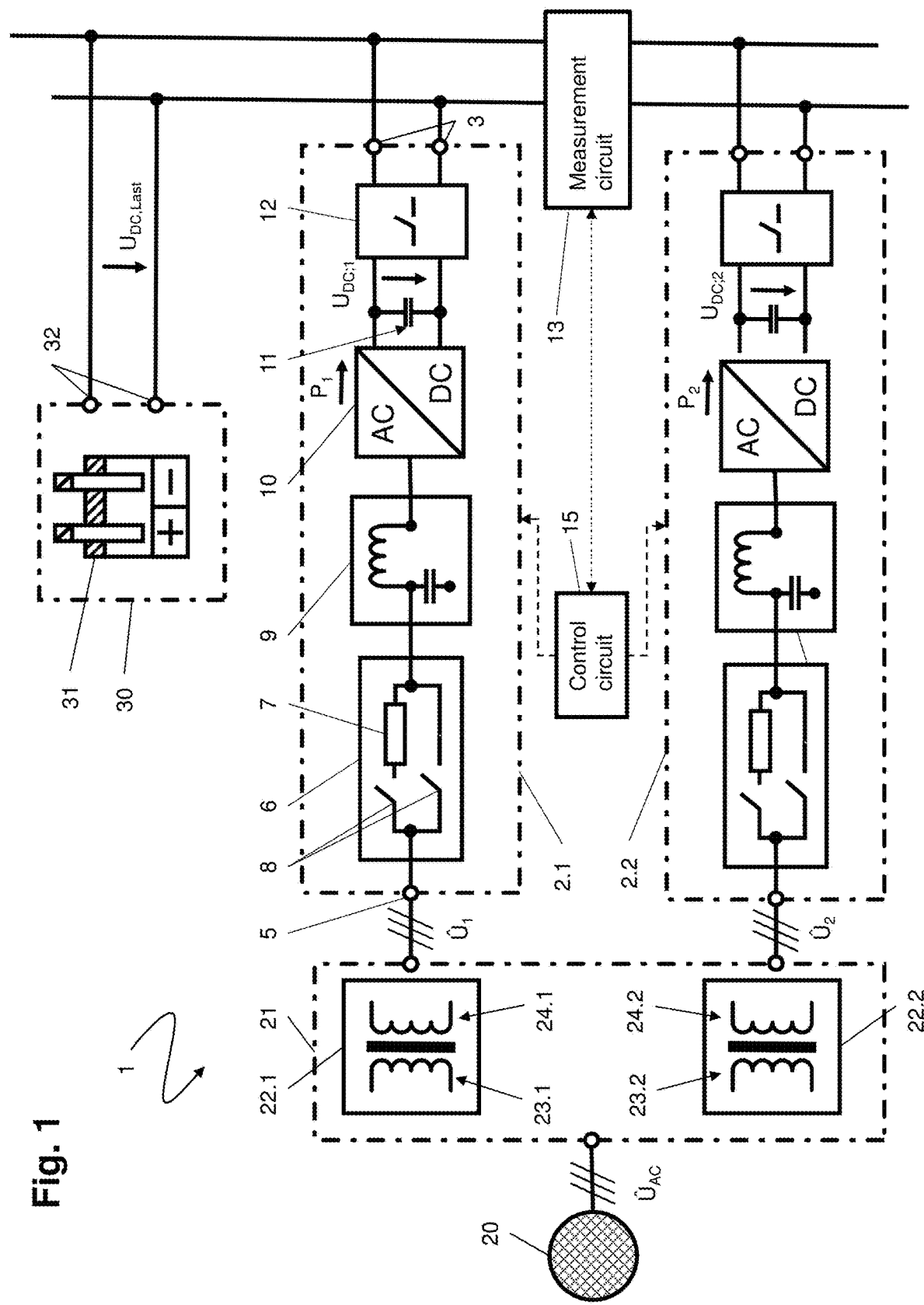
FIG. 1 shows an embodiment of an energy conversion system which is connected on the input side to an AC grid and on the output side to a DC load.

FIG. 1 illustrates an embodiment of an energy conversion system 1 according to the disclosure, which is connected on the input side to an AC grid 20 and on the output side to an input 32 of a DC load 30. By way of example, in this case the DC load 30 is illustrated as an electrolyzer 31. The energy conversion system 1 contains a transformer system 21, a first rectifier 2.1, a second rectifier 2.2, a control circuit 15 that is configured to control the first rectifier 2.1 and the second rectifier 2.2 and a measurement circuit or device 13, that is connected to the control circuit 15 for the purpose of control and for data interchange. The measurement device 13 is configured to measure an input voltage $U_{DC,load}$ present at the input 32 of the DC load 30. The transformer system 21 comprises two separately formed transformers 22.1, 22.2, which each have a primary side 23.1, 23.2 and a secondary side 24.1, 24.2. The primary sides 23.1, 23.2 of the transformers 22.1, 22.2 are connected in parallel with one another to the AC grid 20. The first secondary side 24.1 is connected to the AC input 5 (a first AC input) of the first rectifier 2.1, the second secondary side 24.2 is connected to the AC input 5 (a second AC input) of the second rectifier 2.2. The transformer system 21 is configured, via a corresponding turns ratio of the first secondary side 24.1 to the first primary side 23.1, to transform the polyphase AC voltage of the AC grid 20 having the amplitude $\hat{U}_{AC}$ into a first AC voltage, which is present on the first secondary side 24.1 and has the first amplitude $\hat{U}_1$ and the same number of phases. Correspondingly, via a turns ratio of the second secondary side 24.2 to the second primary side 23.2, the polyphase AC voltage of the AC grid 20 having the amplitude $\hat{U}_{AC}$ is transformed into a second AC voltage, which is present on the second secondary side 24.2 and has the second amplitude $\hat{U}_2$ and the same number of phases. In this embodiment, a value for the second amplitude $\hat{U}_2$ exceeds a corresponding value for the first amplitude $\hat{U}_1$. Each of the rectifiers 2.1, 2.2 comprises, between its AC input 5 and its DC output 3, an AC disconnecting circuit 6, a filter circuit 9, an AC-DC converter (comprised of circuitry) 10, an output capacitance 11 connected on the output side to the AC-DC converter and a DC disconnecting circuit 12. The DC disconnecting circuit 12 is configured to connect and disconnect an output of the AC-DC converter 10, i.e. a DC side of the AC-DC converter, to and from the DC output 3 of the rectifier 2.1, 2.2 and therefore to and from the input 32 of the DC load 30. The AC disconnecting circuit 6 is configured to disconnect and connect the respective secondary side 24.1, 24.2 of the transformer system 21 assigned to the rectifier 2.1, 2.2 from and to an input of the AC-DC converter 10, i.e. from and to an AC-side of the AC-DC converter, (through the filter circuit 9 in one embodiment) assigned to the respective rectifier 2.1, 2.2. The AC disconnecting circuit 6 can additionally optionally be configured to limit a current during precharging of the output capacitance 11 of the rectifier 2.1, 2.2. For this purpose, the AC disconnecting circuit 6 contains two parallel current paths each having a switch 8, wherein a series resistor 7 for current limitation is arranged in one of the two current paths. For reasons of clarity, the reference symbols relating to the components of the rectifiers 2.1, 2.2 are only illustrated in the case of the first rectifier 2.1 in FIG. 1.

In the text which follows, a state is assumed in which each of the rectifiers 2.1, 2.2 is connected to the secondary side 24.1, 24.2 assigned thereto via the closed AC disconnecting circuit 6 of said rectifier, but the corresponding DC disconnecting circuits 12 are still open. In this state, therefore, both the first power flow $P_1$ through the first rectifier 2.1 and the second power flow $P_2$ through the second rectifier 2.2 are suppressed. However, the output capacitance 11 is charged in each of the rectifiers 2.1, 2.2 via a current flow from the AC grid 20 and through the freewheeling diodes of the respective AC-DC converter 10 to a corresponding DC voltage $U_{DC,1}$, $U_{DC,2}$. In one embodiment, a value for the second DC voltage $U_{DC,2}$ of the second rectifier 2.2 exceeds a value for the first DC voltage $U_{DC,1}$ of the first rectifier 2.1 owing to the different AC voltages present at the inputs 5 of the rectifiers 2.1, 2.2, in particular their amplitudes $\hat{U}_1$, $\hat{U}_2$.

Depending on a power consumption of the DC load 30 and an associated input voltage $U_{DC,load}$ at the input 32 thereof, the power flows $P_1$, $P_2$ through the respective rectifiers 2.1, 2.2 are now suppressed or enabled. Specifically, in the case of a startup procedure, first the first power flow $P_1$ through the first rectifier 2.1 can be enabled by closing the DC disconnecting circuit 12 of the first rectifier 2.1, while the second power flow $P_2$ through the second rectifier 2.2 is still suppressed. In one embodiment, the second power flow $P_2$ through the second rectifier 2.2 is enabled when, e.g. via an increase in the input voltage $U_{DC,load}$ of the DC load 30, the consumption of said DC load is increased, for example, when the input voltage $U_{DC,load}$ of the DC load 30 reaches or exceeds a voltage threshold value $U_{TH}$. In the case of input voltages $U_{DC,load}$ of the DC load 30 which are greater than the voltage threshold value $U_{TH}$, it is possible, depending on the consumption of the DC load 30 and on rated powers of the rectifiers 2.1, 2.2, for the DC load 30 to be supplied power only by the second power flow $P_2$ or by a combination of the first power flow $P_1$ and the second power flow $P_2$.

In FIG. 1, the AC grid 20 is illustrated, by way of example, as a three-phase AC grid 20 and therefore also the rectifiers 2.1, 2.2 are illustrated with an input 5 configured with three phases. Likewise, the transformer system 21 is configured to transform the three-phase AC voltage of the AC grid 20 into a three-phase first AC voltage and a three-phase second AC voltage. In the context of the disclosure, however, other numbers of phases are also possible. For example, the AC grid can also be configured as a single-phase AC grid 20, the transformer system 21 as a single-phase transformer system 21 and/or the inputs 5 of the rectifiers 2.1, 2.2 as single-phase inputs 5. As an alternative to this, the AC grid 20, the transformer system 21 and/or the inputs of the rectifiers can also be configured to have a plurality of phases, wherein the number of phases is different than three. Furthermore, it is possible for the rectifiers 2.1, 2.2 to have further components which are not explicitly illustrated in FIG. 1, for example measurement devices for measuring current and/or voltage at the input and/or output of the AC-DC converters 10 or a communications circuit.

Figure 2:
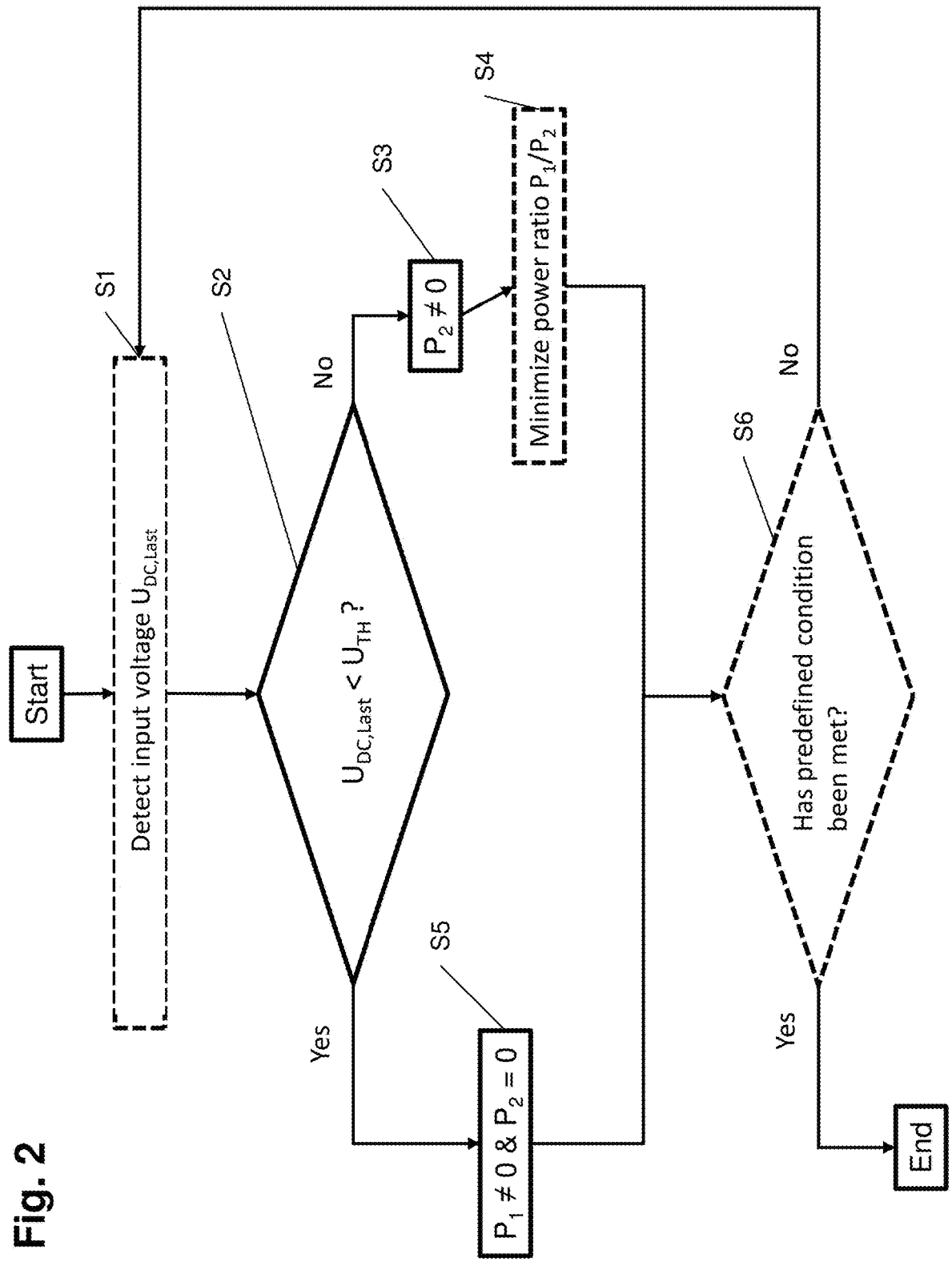
FIG. 2 a flowchart of the method according to the disclosure in one embodiment.

FIG. 2 illustrates a flowchart of an embodiment of the method according to the disclosure, as can be implemented using the energy conversion system 1 from FIG. 1. The method starts with a first act S1, in which an input voltage $U_{DC,load}$ present at the input 32 of the DC load 30 is detected, for example, via the measurement device 13 and passed on to the control circuit 15. The first act S1 is, however, only optional, which is illustrated in the flowchart via a dashed frame line. Thus, in one embodiment the input voltage $U_{DC,load}$ can be known to the control circuit 15 by other means, for example, because specific DC voltages $U_{DC,1}$, $U_{DC,2}$ at the output of the AC-DC converter(s) 10 are preset by the control circuit 15, and at least one of the DC disconnecting circuits 12 is closed. In this case, the first act S1 is not required. In a second act S2, the control circuit 15 compares a value for the detected input voltage $U_{DC,load}$ with a predefined voltage threshold value $U_{TH}$. When the value for the input voltage $U_{DC,load}$ of the DC load 30 falls below the voltage threshold value $U_{TH}$, the method branches to a fifth act S5, in which the first power flow $P_1$ through the first rectifier 2.1 is enabled, while the second power flow $P_2$ through the second rectifier 2.2 is suppressed. In this embodiment, the suppression of the second power flow $P_2$ can take place, for example, by opening the DC disconnecting circuit 12 of the second rectifier 2.2. In this embodiment, the DC load 30 is therefore supplied power by the first power flow $P_1$ of the first rectifier 2.1. If, on the other hand, the detected input voltage $U_{DC,load}$ of the DC load 30 is greater than or equal to the voltage threshold value $U_{TH}$, the method branches from the second act S2 to a third act S3, in which the second power flow $P_2$ through the second rectifier 2.2 is enabled, for example, by closing of the corresponding DC disconnecting circuit 12. In a fourth act S4, which follows on from the third act S3, a ratio of the first power flow $P_1$ to the second power flow $P_2$ can be minimized in order to operate the energy conversion system 1 overall with as high an efficiency as possible and low power losses. The fourth act S4 is, however, again optional and not absolutely necessary, which is again characterized via a dashed frame line. In the subsequent sixth act S6, a check is performed to ascertain whether a predefined termination condition has been met. If this is not the case, the method jumps back to the first act S1. If, on the other hand, the termination condition is met, the method ends. The sixth act S6 which, depending on which branch is run through in response to the query in the second method act S2, follows on from the fifth act S5 or the fourth act S4, is also an optional method act and is therefore illustrated by dashed lines in the flowchart. In an embodiment in which the sixth act S6 is not provided, the method can jump back to the first act directly after the fifth act S5 or after the fourth act S4.

In the context of the disclosure, it is possible for a specific consumption or a consumption/time profile of the DC load to be set and tracked by means of the control circuit 15. If, for example, a consumption of the DC load 30 is intended to be increased, the first rectifier 2.1 is driven, via the control circuit 15, to temporarily increase its first DC voltage $U_{DC,1}$ present at the output capacitance 11. When the DC disconnecting circuit 12 of the first rectifier 2.1 is closed, this voltage is also present as input voltage $U_{DC,load}$ at the input 32 of the DC load 30. The same applies accordingly also to the second rectifier 2.2. Thus, when the DC load 30 is supplied power by a combination of the first power flow $P_1$ and the second power flow $P_2$ that each are different than 0 W (i.e., non-zero), the second rectifier 2.2 is also driven at the same time as the first rectifier 2.1, via the control circuit 15, with the aim of temporarily increasing its second DC voltage $U_{DC,2}$ present at its output capacitance 11. When the DC load 30 is supplied power by a combination of the first power flow $P_1$ and the second power flow $P_2$, values for the first DC voltage $U_{DC,1}$, the second DC voltage $U_{DC,2}$ and the input voltage $U_{DC,load}$ of the DC load 30 are virtually identical. A variation in the first power flow $P_1$ relative to the second power flow $P_2$ of the combination can take place using the control circuit 15 by virtue of the control circuit correspondingly driving the semiconductor switches of the first rectifier 2.1 and the second rectifier 2.2, for example, the semiconductor switches assigned to the AC-DC converters thereof. For example, the values of the DC voltages $U_{DC,1}$, $U_{DC,2}$ present at the output capacitances 11 of the respective rectifiers 2.1, 2.2 can be varied slightly with respect to one another via the corresponding driving of the semiconductor switches, and thereby establish the variation in the power flows.

What is claimed is:

1. A method for supplying power to a DC load by means of an energy conversion system comprising a first rectifier, a second rectifier and a transformer system, wherein each of the first and second rectifiers comprises an AC-DC converter and is connected to a commonly used AC grid via a separate secondary side of the transformer system, wherein the transformer system is configured to provide a first AC voltage having a first voltage amplitude ($\hat{U}_1$) on a first secondary side and a second AC voltage having a second voltage amplitude ($\hat{U}_2$) on a second secondary side, wherein a value of the second voltage amplitude ($\hat{U}_2$) exceeds a corresponding value of the first voltage amplitude ($\hat{U}_1$), comprising:

i) operating the first rectifier with a first non-zero power flow ($P_1$) to supply power to the DC load when an input voltage ($U_{DC,load}$) at an input of the DC load falls below a voltage threshold value ($U_{TH}$), wherein a second power flow ($P_2$) through the second rectifier is suppressed, and ii) operating the second rectifier with a second non-zero power flow ($P_2$) to supply power to the DC load when the input voltage ($U_{DC,load}$) at the input of the DC load reaches or exceeds the voltage threshold value ($U_{TH}$).

2. The method as claimed in claim 1, wherein the second power flow ($P_2$) through the second rectifier is suppressed by means of an open AC disconnecting circuit between the second secondary side of the transformer system and the AC-DC converter of the second rectifier and/or a DC disconnecting circuit between the AC-DC converter of the second rectifier and the input of the DC load.

3. The method as claimed in claim 1, further comprising suppressing the first non-zero power flow ($P_1$) and the second non-zero power flow ($P_2$) in an initial state of a startup procedure for supplying power to the DC load using the energy conversion system.

4. The method as claimed in claim 1, further comprising suppressing the first non-zero power flow ($P_1$) and the second non-zero power flow ($P_2$) in an end state of a shutdown procedure during the power supply to the DC load using the energy conversion system.

5. The method as claimed in claim 1, wherein, in the method, method acts i) and ii) are run through in an order such that method act ii) follows method act i).

6. The method as claimed in claim 1, wherein, in the method, method acts i) and ii) are run through in an order such that method act i) follows method act ii).

7. The method as claimed in claim 1, wherein, in method act ii), a ratio of the first power flow ($P_1$) to the second power flow ($P_2$), ($P_1/P_2$), for supplying power to the DC load is minimized.

8. The method as claimed in claim 1, wherein method acts i) and ii) are run through temporally repeatedly to track a change in a consumption of the DC load or to set a consumption/time profile of the DC load using a control circuit.

9. An energy conversion system for supplying power to a DC load from an AC grid, comprising:

a transformer system, that is connectable on a primary side thereof to the AC grid and is configured to provide a first AC voltage having a first voltage amplitude ($\hat{U}_1$)

on a first secondary side and a second AC voltage having a second voltage amplitude ($\hat{U}_2$) on a second secondary side, wherein a value of the second voltage amplitude ($\hat{U}_2$) exceeds a corresponding value of the first voltage amplitude ($\hat{U}_1$), a first rectifier connected on an input side thereof to the first secondary side, and a second rectifier connected on an input side thereof to the second secondary side, which rectifiers are each connected on their respective output side and in parallel with one another to an input of the DC load, and a control circuit configured to control the energy conversion system, wherein the control circuit or the control circuit in combination with further components of the energy conversion system is configured to:

i) operate the first rectifier with a first non-zero power flow ($P_1$) to supply power to the DC load when an input voltage ($U_{DC,load}$) at the input of the DC load falls below a voltage threshold value ($U_{TH}$), wherein a second power flow ($P_2$) through the second rectifier is suppressed, and ii) operate the second rectifier with a second non-zero power flow ($P_2$) to supply power to the DC load when the input voltage ($U_{DC,load}$) at the input of the DC load reaches or exceeds the voltage threshold value ($U_{TH}$).

10. The energy conversion system as claimed in claim 9, wherein the transformer system comprises a first transformer comprising a first primary side and the first secondary side coupled inductively thereto, and a second transformer comprising a second primary side that is different than the first primary side, and the second secondary side inductively coupled thereto.

11. The energy conversion system as claimed in claim 9, wherein the transformer system comprises a primary side inductively coupled both to the first secondary side and to the second secondary side.

12. The energy conversion system as claimed in claim 9, wherein the first rectifier and/or the second rectifier is/are configured to provide a bidirectional power flow.

13. The energy conversion system as claimed in claim 9, wherein the first rectifier and/or the second rectifier comprises a single-stage rectifier.

14. The energy conversion system as claimed in claim 9, wherein the energy conversion system comprises a measurement circuit connected to the control circuit, wherein the measurement circuit is configured to detect the input voltage ($U_{DC,load}$) present at the input of the DC load.

15. The energy conversion system as claimed in claim 9, wherein the transformer system comprises a plurality of taps for varying the first voltage amplitude ($\hat{U}_1$) and/or the second voltage amplitude ($\hat{U}_2$) relative to an amplitude ($\hat{U}_{AC}$) of the AC voltage of the AC grid.

16. An electrolysis system comprising an energy conversion system for supplying power to a DC load from an AC grid, the energy conversion system comprising:

a transformer system, that is connectable on a primary side thereof to the AC grid and is configured to provide a first AC voltage having a first voltage amplitude ($\hat{U}_1$) on a first secondary side and a second AC voltage having a second voltage amplitude ($\hat{U}_2$) on a second secondary side, wherein a value of the second voltage amplitude ($\hat{U}_2$) exceeds a corresponding value of the first voltage amplitude ($\hat{U}_1$), a first rectifier connected on an input side thereof to the first secondary side, and a second rectifier connected on an input side thereof to the second secondary side, which rectifiers are each connected on their respective output side and in parallel with one another to an input of the DC load, and a control circuit configured to control the energy conversion system, wherein the control circuit or the control circuit in combination with further components of the energy conversion system is configured to:

i) operate the first rectifier with a first non-zero power flow ($P_1$) to supply power to the DC load when an input voltage ($U_{DC,load}$) at the input of the DC load falls below a voltage threshold value ($U_{TH}$), wherein a second power flow ($P_2$) through the second rectifier is suppressed, and ii) operate the second rectifier with a second non-zero power flow ($P_2$) to supply power to the DC load when the input voltage ($U_{DC,load}$) at the input of the DC load reaches or exceeds the voltage threshold value ($U_{TH}$), and wherein the electrolysis system comprises an electrolyzer as the DC load.

* * * * *